United States Patent [19]

Blonstein et al.

[11] Patent Number: 5,218,647
[45] Date of Patent: Jun. 8, 1993

[54] METHOD TO CONVERT BETWEEN 2 COLOR SPACES ON A 32 BIT μ-PROCESSOR

[75] Inventors: Steven M. Blonstein, San Jose; James D. Allen, Santa Cruz, both of Calif.

[73] Assignees: Ricoh Corporation, Menlo Park, Calif.; Ricoh Company, Ltd., Tokyo, Japan

[21] Appl. No.: 628,904

[22] Filed: Dec. 12, 1990

[51] Int. Cl.⁵ .............................. G06K 9/46
[52] U.S. Cl. ..................... 382/17; 358/13; 358/75; 382/56
[58] Field of Search .............. 382/17, 56, 47; 358/13, 358/31, 80, 75

[56] References Cited

U.S. PATENT DOCUMENTS

| | | | |
|---|---|---|---|
| 4,747,154 | 5/1988 | Suzuki et al. | 382/47 |
| 4,951,129 | 8/1990 | Lang | 358/31 |
| 4,951,139 | 8/1990 | Hamilton et al. | 358/13 |
| 4,974,071 | 11/1990 | Maeda | 358/13 |
| 4,998,286 | 3/1991 | Tsujiuchi et al. | 382/17 |
| 5,038,202 | 8/1991 | Ooishi et al. | 358/13 |

Primary Examiner—Joseph Mancuso
Attorney, Agent, or Firm—Heller, Ehrman, White & McAuliffe

[57] ABSTRACT

An improved method for converting between two color spaces such as the RGB and YIQ color on a 32 bit microprocessor. The present invention only requires in total number of operations three table look-ups, two adds, two barrel shifts and two masking operations. In terms of speed it is believed that the present invention is optimal for microprocessors such as 32 bit microprocessors.

10 Claims, 3 Drawing Sheets

CONVERSION MATRIX FOR RGB TO YIQ COLOR SPACE $$\begin{bmatrix} Y \\ I \\ Q \end{bmatrix} = \begin{bmatrix} 0.299 & 0.587 & 0.144 \\ 0.596 & -0.274 & -0.322 \\ 0.211 & -0.532 & 0.312 \end{bmatrix} \begin{bmatrix} R \\ G \\ B \end{bmatrix}$$

FIG. 1A

CONVERSION MATRIX FOR YIQ TO RGB COLOR SPACE $$\begin{bmatrix} R \\ G \\ B \end{bmatrix} = \begin{bmatrix} 1.000 & 0.956 & 0.621 \\ 1.000 & -0.272 & -0.647 \\ 1.000 & -1.106 & 1.703 \end{bmatrix} \begin{bmatrix} Y \\ I \\ Q \end{bmatrix}$$

FIG. 1B

METHOD TO CONVERT BETWEEN 2 COLOR SPACES ON A 32 BIT μ-PROCESSOR

BACKGROUND OF THE INVENTION

The present invention relates to an improved method for convecting between two color spaces, such as between RGB and YIQ color spaces.

In many applications that perform color image processing, it is necessary to convert back and forth between two color spaces. Consider the domain of color image compression as an example, although the present invention is not limited to this one application.

A typical color image compression apparatus includes a transmitting color fax machine, telephone connection, and a receiving color fax machine. At the transmitting end, the fax machine must scan the image first.

Most conventional scanning methods scan in the red, green, and blue (RGB) color space. This is usually the simplest for hardware/cost reasons. However, it has been shown in previous work that in order to compress a color image it is better to perform the compression on a color space that consists of a luminance color plane, and two color planes. Such a color space is the YIQ color space.

It turns out that the YIQ color space is superior for color image compression, because in spatial terms the rate of change of the I and Q planes is less perceptible to the human eye than say the luminance plane Y. Compression techniques take advantage of this fact, by performing simple spatial compression on the I and Q planes before any actual quantization is performed to further compact the data.

A typical example of a compression system would have the front end scanner providing a color image that yields 24 bits of data per pixel. This is normally 8 red bits, 8 green bits, and 8 blue bits. The conversion to Y,I,Q can yield three new 8 bit numbers but by combining 2 neighboring I values and 2 neighboring Q values together, the net effect is now the data is only 16 bits per pixel. Thus, 8 bits per pixel have been removed almost immediately.

More often than not the conversion form RGB to YIQ is performed in software, running on a machine such as the Motorola 68030. FIG. 1a shows the linear transformation for RGB to YIQ. Note that the numbers in the 3×3 matrix are not very "friendly." They are signed floating point numbers. Should the user decide to make the conversion using simple multiplication it would require 9 multiplications and 6 additions, i.e.:

$$Y = (0.299^*R) + (0.587^*G) + (0.114^*B) - \text{the calculation}$$

is repeated twice more for I and Q.

Though this would prove to be the simplest in terms of code length and memory storage requirements, it is certainly not the quickest approach because of the need for the multiplications.

A very common approach used to eliminate multiplication is to use preprogrammed look-up tables. The user would premultiply all the possible R, G, B values and store them in look-up tables. Initial inspection would reveal the need for 9 separate look-up tables, each 256 entries by 16 bits wide. The possible ranges for R, G, and B are normally 0–255, stored in a single 8 bit number. However, after the linear conversion, Y has a range of 0–255 (8 bits), I has a range of +151 to −151, and Q has a range +136 to −136. To represent these values requires 9 bits instead of 8.

Because of the structure of modern microprocessor systems, once 8 bits numbers have been exceeded one normally jumps to 16 bits for the convenience of addressing purposes. Therefore, a total memory requirement now is 9×256×2 bytes or 4.5 Kbytes.

To perform the conversion, the user constructs a program that takes the R value and indexes into the Y(R) table, looks-up the value and holds it. Now take the G value, look-up the Y(G) value and add that to the Y(R) value. Finally, do the same for 0 and add to the previous total to yield the final Y value. This requires 3 look-ups and two adds. The same process is performed for I and Q, resulting in 9 look-ups and 6 adds. In comparison to above, the 9 multiplies have been replaced by 9 look-ups which are typically an order of magnitude faster than a multiply.

SUMMARY OF THE INVENTION

It is an object of the present invention to provide improved method for converting between two color spaces on a 32 bit microprocessor.

It is a more particular object of the invention to provide an improved method for converting between RGB and YIQ color spaces, respectively.

The present invention provides an improved conversion technique For example, in one embodiment the present invention provides for converting between RGB and YIQ color spaces wherein the total number of operations required is three table look-ups, two adds, two barrel shifts, and two masking operations.

Other objects, features and advantages of the present invention will become apparent when taken in conjunction with the following detailed description.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 1A and 1B depict conversion matrixes for RGB to YIQ and YIQ to RGB color space, respectively.

DETAILED DESCRIPTION OF THE PREFERRED EMBODIMENTS

Figure 2:
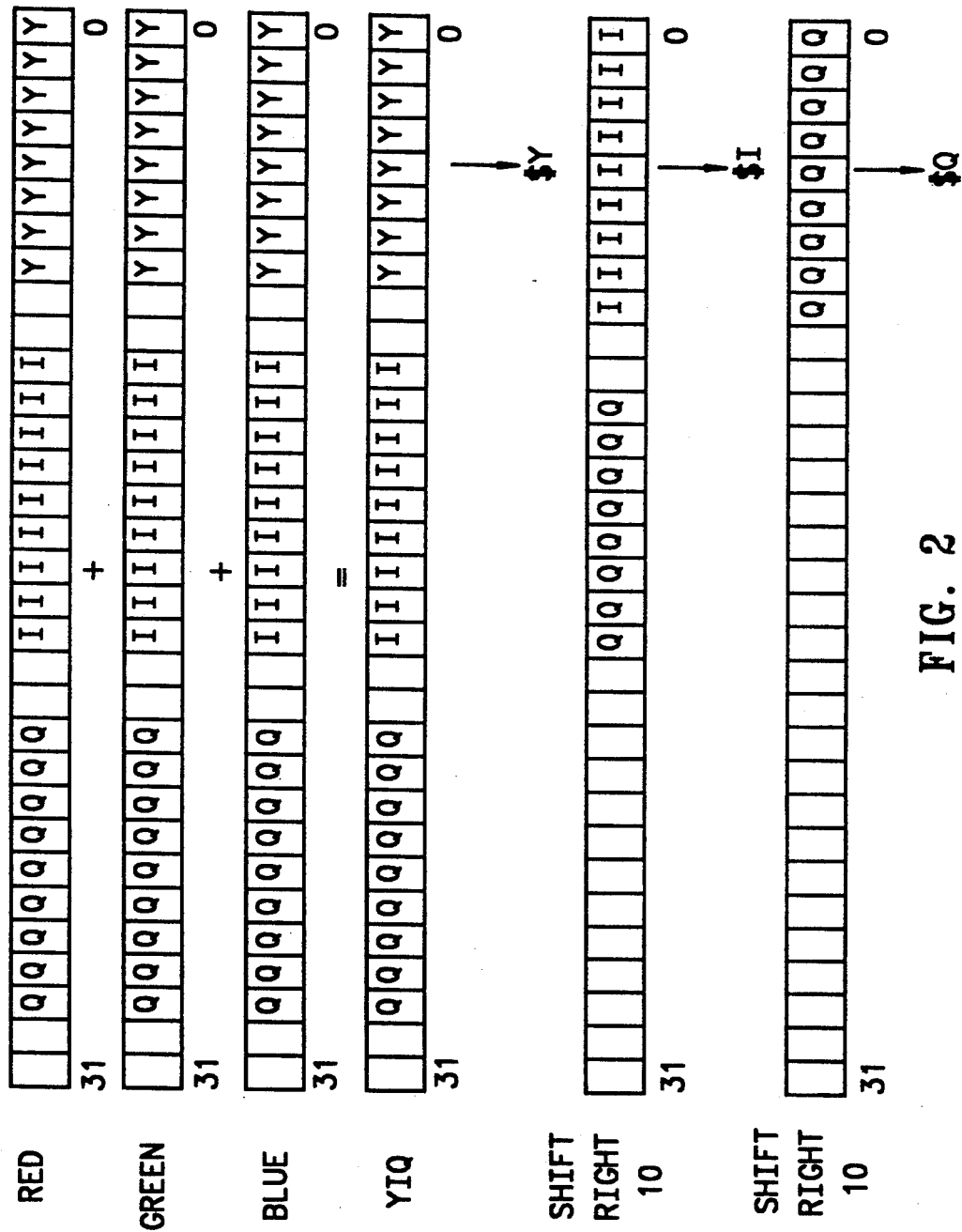
FIG. 2 depicts an arrangement of data within a 32-bit shift register.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Many microprocessors, such as the 68030, contain a built-in barrel shifting mechanism. Traditionally, shifting was a relatively slow operation in software, because the instruction execution time was proportional to the number of shifts needed. For example, if a number X is in register DO and wants to be shifted 5 times it might take 300 nS. If it is desirable to shift by 10 places then it would probably take about 600nS without a barrel shifter.

The advantage of a barrel shifter is that all shifts, irrespective of the number of places, take the same time. This is used to great advantage in the present invention, which sets up only three look-up tables instead of the nine mentioned above.

There are 256 entries, each of 32 bits. Thus, the total storage requirements are 3 times 256 ×4 bytes or only 3 Kbytes, which is 33% less than mentioned above. The generation of the tables is as follows.

The 32 bit locations are divided up into 3 10 bit compartments. Each precalculated look-up element is placed within the relevant compartment in the 32 bit location. The operations required to do the conversion now consist of just three look-ups.

First of all, one 32 bit number is looked up for the Red component. This value is held. Next, a 32 bit number is looked up for the G component and the two 32 bit numbers are added together. Finally, a 32 bit value for the B component is looked up and added to the previous 32 bit total. Now just one 32 bit result is being held.

To get the Y value (sitting in the lowest 10 bits of the 32 bit value), the method according to the present invention masks off the low 8 bits. Note, in the case where the value Y is in the range 0–255, this mask is not necessary.

The mask is a single operation whose time consumption approximates a single add. Now, the method shifts the 32 bit number 10 times to the right and masks off the low 9 bits. This requires a single barrel shift and a mask operation to yield I. Finally, the method shifts the 32 bit number 10 more times to the right and masks off the bottom 9 bits to yield Q. Therefore the total number of operations required is 3 look-ups, 2 adds, 2 barrel shifts, and 2 masking operations. In terms of speed, it is believed that this method is optimal for processors such as the 68030 and other similar 32 bit devices.

To illustrate the process in action, a specific example will be described and run through all of the operations in both directions. It is important to note that look-up tables can introduce small numeric errors due to rounding in the setting up of the table. This explains why the input and output values differ by a small amount.

FIG. 2 shows a diagram of how the data is organized within the 32 bit locations. The three memory look-up values are summed in a single data register and the result is then masked and shifted to provide the Y, I, and Q values.

Take the values: R=50, G=75, B=97 as the input. (Assume base 16).

Referring to the attached look-up tables (Appendix A), go to the $R_{13}$ YIQtbl. To locate R=50, go down the first column to the 11th row. Pick out the 32 bit number $00b08018. Now do the same for G=75 in the $G_{13}$ YIQtbl. Find the value $0d73ac45. Add this to the previous value to yield $0e242c5d. Finally, locate B=97 in the $B_{13}$ YIQtbl. $01f38011 is added to the previous running total to yield a result $1017ac6e. Now start the masking and shifting operations.

Start with the value $1017ac6e. Masking off the low eight bits with $000000ff yields a Y value of $6e. (or +110 in decimal).

Now shift the 32 bit number 10 times to the right. This yields a number $000405eb. Now mask off the low order 8 bits with a mask $000000ff to yield $eb. This is equivalent to decimal −21 because I is a signed number.

Now shift the 32 bit value by 10 more positions to the right. This yields the number $00000101. Mask off the low order 8 bits to yield a value for Q of $01.

Therefore, Y=$6e, I=$eb, Q=$01.

Now use the second set of tables to perform the reverse operation.

For Y=$6e, Y_RBGtbl yields $06e1b86e
For I=$eb, I_RBGtbl yields $023027e2
For Q=$01, a_RGBtbl yields $003ffc01.

Add these together to yield $0951dc51.

Mask off the low order 8 bits to yield Red =$51 ($50 was the start value) Shift right ten times to yield $00025477. Mask off the low order 8 bits to yield Green =$77 ($75 originally). Shift right ten more times to yield $00000095. Thus Blue =$95.

This completes the process.

In the set of tables attached as Appendix A, the look-up values for I and a have been scaled down by a constant factor 1.5. However, it should be stressed that the above technique will be fully operational with I and Q as signed 9 bit numbers ranging from +151 to −151 for I and +136 to −136 for Q.

DISCUSSION OF PERFORMANCE

Absolute performance is a difficult subject. It will depend on the actual processor, its clock speed, whether cache memory is enabled etc. However, for comparative purposes, assume a 68030 processor is used. We will count Machine cycles are counted to eliminate the variable of clock speed. Also assume that the multiplication is done with the integer unit (assume some scaling of the multipliers by say 1000). In reality, such a scaling would require a final division stage, though this will not be counted in the calculation.

Method 1: Multiplication
9 multiplies @28 cycles each =252 cycles.
6 adds @2 cycles each =12 cycles.
Total =264 cycles.

Method 2: Simple Look-up Method 9 look-ups @4 cycles each =36 cycles
6 adds @2 cycles each =12 cycles
Total =48 cycles

Method 3: Novel Look-Up Method 3 look-ups @4 cycles each =12 cycles
2 adds @2 cycles each =4 cycles
2 masks @2 cycles each =4 cycles
2 10bit shifts @2 cycles each =4 cycles
Total =24 cycles.

This yields an improvement of about 50% in speed. For a color image that is 1024×1024 pixels, the savings of 24 cycles per pixel on both conversions saves over 50 million cycles of operation. On a typical 16 MHz 68030 this would yield over 3 seconds of saved processor time.

Accuracy & Improved Mode of Operation

In many cases, the accuracy achieved in the above method is adequate. In a color image compression system, at high bit rates, the error introduced by the look-up may be unacceptable. Therefore an improved accuracy mode is desired, although it does result in the addition of one machine instruction.

Figure 3:
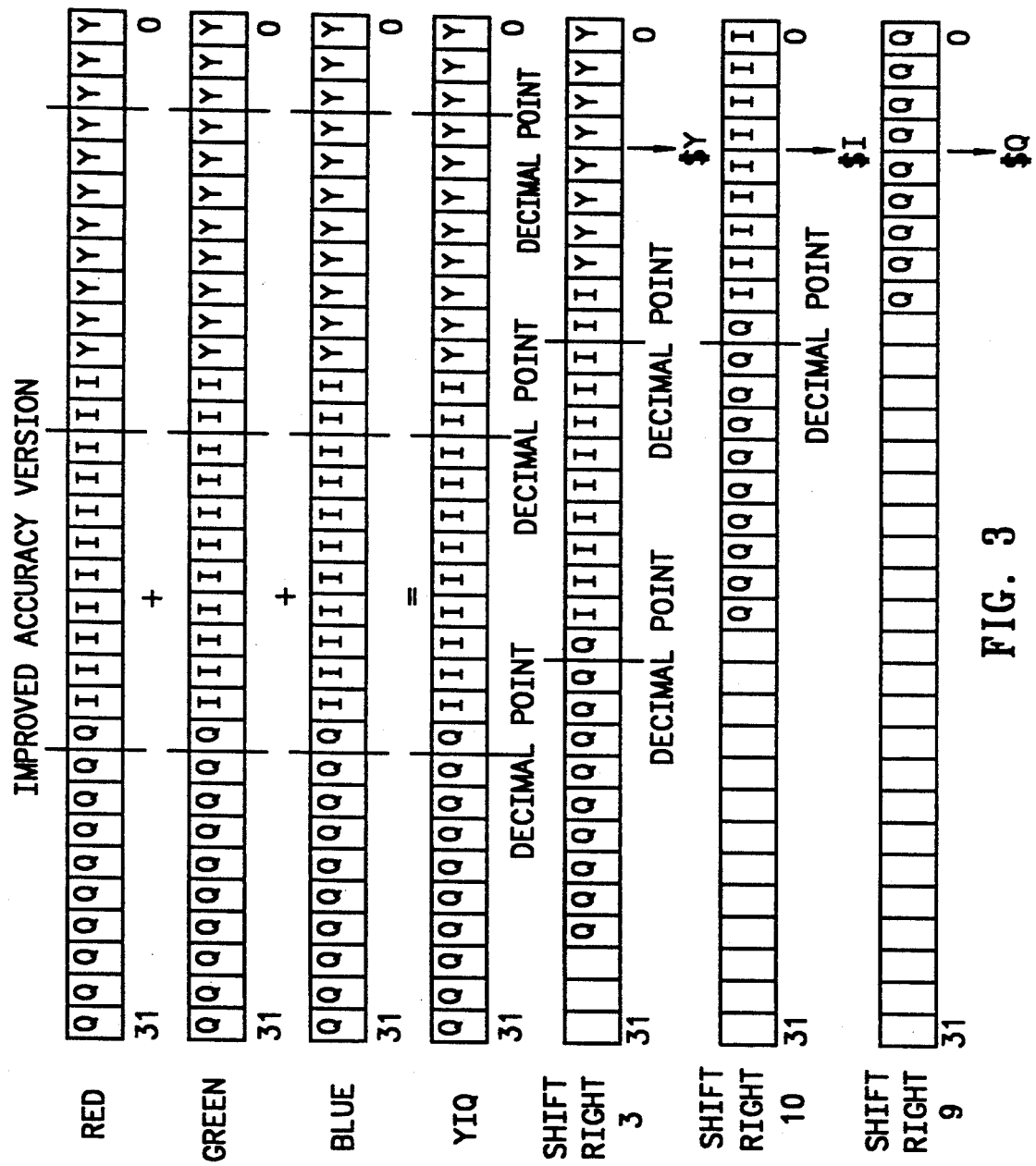
FIG. 3 depicts a diagram of improved accuracy version, according to the present invention.

The best mode of operation is shown in FIG. 3. Now instead of allocating 3 ten bit cells, allocate 11 bits to Y and I, and 10 bits to Q. Therefore, all 32 bits are used up. The eleven bits for Y are used up in the following way. The value of Y can range from 0 to 255. Use the additional 3 bits to represent precision to the right of the decimal point. Thus, the present invention is able to store to precision ⅛ for Y. Thus when the YR, YG, and YB components are generated, instead of rounding to the nearest integer, we round to the nearest ⅛. Below an example is shown where this provides a definite improvement over the previous version.

Say R=65, G=28, B=37. Under the first scheme the following components are generated:
YR=65* 0.299 =19.435 would be rounded to 19
YG=28* 0.587 =16.436 would be rounded to 16
YB=37* 0.14 =4.218 would be rounded to 4.

On adding up the values YR, YG, YB results in Y=39.

Under the new scheme:
YR =19.435 would be rounded to 19.375 or 19 ⅜
YG =16.436 would be rounded to 14.375 or 14 ⅜
YB =4.218 would be rounded to 4.25 or 4 ¼.

On adding up the values YR, YG, YB results in Y=40.

If the original floating point numbers are added up, one will get 40.089. Thus the new estimate of 40 is far closer than 39.

For I, dedicate two extra bits in order to round to the nearest ¼, and for Q allow 1 extra bit so round to the nearest ½. This is an arbitrary allowance of the extra bits. It should be noted that other combinations may provide even better accuracy For the inverse calculation, YIQ to RGB, a different set of precisions should be chosen. Due to the multipliers such as 1.703, it is necessary to allow more bits to the left of the decimal place, thus it is necessary to sacrifice accuracy to the right of the decimal place. The exercise of optimizing these bit allocations need not be discussed further.

FIG. 3 illustrates that one additional shift is required to achieve the same results. The first shift is by 3 places to remove the unwanted bits to the right of the decimal point. Note it is also possible to round the result based on the value of these three bits. If the third bit is set, round off or else do nothing. However, this would require an additional instruction. The second shift is by 10 places to get the I component, again rounding is possible, and finally a shift by 9 gets the Q component.

Provided only one shift is added then only 2 additional clock cycles are required, yielding a total of 26 cycles.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for converting between RGB and YIQ color spaces comprising the steps of:
    generating first, second and third look-up tables, each having a predetermined number of precalculated entries of a certain number of bit locations corresponding to said RGB color space,
    dividing each of the bit locations into at least three compartments of a lesser number of bit locations, such that each compartment corresponds to a YIQ color space component,
    looking up a first bit location number corresponding to the R (red) component,
    looking up a bit number location for the G (green) component and adding the two bit number locations together,
    looking up a bit location for the B (blue) component and adding to the previous bit total to form a calculated bit result such that the Y, I and Q components have been calculated simultaneously,
    masking off a certain number of low order bits to obtain the Y component value of said second color space,
    shifting the bit number a predetermined number of times and masking off the low order bits using a single barrel shift and mask operation to form the I component,
    shifting the bit number a certain number of times more to the right and masking off the bottom low order bits to form the Q component, thereby increasing the speed of the color space conversion.

2. The method of claim 1 wherein said certain number of bit locations of said precalculated entries is thirty-two.

3. The method of claim 1 wherein the greatest of said lesser number of bit locations is greater than eight.

4. The method of claim 3 wherein the Q and I components have at least 9 bits of resolution, and the Y component has at least 8 bits of resolution.

5. The method of claim 4 wherein said certain number of bit locations of said precalculated entries is thirty-two.

6. A method for converting image data between a first color space having a certain number of components and a second color space having a certain number of components comprising the steps of:
    generating one look-up table for each component of said first color space, each table having a predetermined number of precalculated entries of a certain number of bit locations, each entry of each table corresponding to a particular value of a particular component of said first color space, each entry of each table being divided up into a number of compartments of a lesser number of bit locations, said number of compartments being at least as large as said certain number of components of said second color space;
    looking up certain entries in said tables corresponding to values of components of said first color space;
    adding said certain entries to form a sum; and
    performing barrel shifting and masking operations to extract the values of components of said second color space from said sum.

7. The method of claim 6 wherein said barrel shifting and masking operations step is comprised of:
    for each component of said second color space performing the step of masking off a number of low order bits of said sum to obtain the value of each component of said second color space;
    for each component of said second colr space except one, performing the step of barrel shifting said sum.

8. The method of claim 7 wherein said certain numbers of components of said first and second color spaces is three.

9. The method of claim 8 wherein the greatest of said lesser number of bit locations is greater than eight.

10. The method of claim 8 wherein said certain number of bit locations of said precalculated entries is thirty-two.

* * * * *